April 28, 1936. E. RICE, JR Re. 19,950

METHOD AND APPARATUS FOR REFRIGERATION

Original Filed July 14, 1930 11 Sheets-Sheet 1

Inventor
Edward Rice Jr.
by his Attorneys
Howson & Howson

April 28, 1936. E. RICE, JR Re. 19,950

METHOD AND APPARATUS FOR REFRIGERATION

Original Filed July 14, 1930 11 Sheets-Sheet 2

Inventor:
Edward Rice Jr
by his Attorneys
Howson & Howson

METHOD AND APPARATUS FOR REFRIGERATION

Original Filed July 14, 1930 11 Sheets-Sheet 3

Inventor
Edward Rice Jr.
by his Attorneys
Howson & Howson

April 28, 1936. E. RICE, JR Re. 19,950

METHOD AND APPARATUS FOR REFRIGERATION

Original Filed July 14, 1930 11 Sheets-Sheet 4

Inventor
Edward Rice Jr
by his Attorneys
Howson & Howson

METHOD AND APPARATUS FOR REFRIGERATION

Original Filed July 14, 1930 11 Sheets-Sheet 5

Inventor:
Edward Rice Jr.
by his Attorneys
Howson & Howson

April 28, 1936. E. RICE, JR Re. 19,950

METHOD AND APPARATUS FOR REFRIGERATION

Original Filed July 14, 1930 11 Sheets-Sheet 6

Inventor
Edward Rice Jr.
by his Attorneys
Howson & Howson

METHOD AND APPARATUS FOR REFRIGERATION

Original Filed July 14, 1930 11 Sheets-Sheet 7

Inventor:
Edward Rice Jr.
by his Attorneys
Howson & Howson

April 28, 1936. E. RICE, JR Re. 19,950

METHOD AND APPARATUS FOR REFRIGERATION

Original Filed July 14, 1930 11 Sheets-Sheet 8

Inventor
Edward Rice Jr.
by his Attorneys
Spencer & Spencer

METHOD AND APPARATUS FOR REFRIGERATION

Original Filed July 14, 1930 11 Sheets-Sheet 9

Inventor:
Edward Rice Jr.
by his Attorneys
Spencer & Spencer

METHOD AND APPARATUS FOR REFRIGERATION

Original Filed July 14, 1930 11 Sheets-Sheet 10

Inventor:
Edward Rice Jr.
by his Attorneys
Howson & Howson

April 28, 1936. E. RICE, JR Re. 19,950

METHOD AND APPARATUS FOR REFRIGERATION

Original Filed July 14, 1930 11 Sheets-Sheet 11

Inventor
Edward Rice Jr.
by his Attorneys
Spurson & Spurson

Reissued Apr. 28, 1936 Re. 19,950

UNITED STATES PATENT OFFICE 19,950

METHOD AND APPARATUS FOR REFRIGERATION

Edward Rice, Jr., New York, N. Y., assignor to International Carbonic, Inc., Wilmington, Del., a corporation of Delaware Original application July 14, 1930, Serial No. 467,999. Divided and this application August 25, 1934, Serial No. 741,465, Patent No. 1,992,889, dated February 26, 1935. Application for reissue March 7, 1936, Serial No. 67,735

28 Claims. (Cl. 62—91.5)

This invention relates to improvements in methods and means for refrigerating by use of solid refrigerants, such as water ice (solid $H_2O$) and carbon dioxide ice (solid $CO_2$).

The invention described and claimed herein resides in a novel method and means for controlling the heat flow from the refrigerated space or material to a solid refrigerant, such as solid $CO_2$, water brine ice or other solid refrigerant of a relatively low melting point as compared with the refrigerating temperatures desired, wherein the heat flow from the refrigerated space or material is absorbed on extended surfaces of a heat conductor and is transmitted by the conductor to adjacent surfaces of the solid refrigerant. This is accomplished by providing an obstruction in the path of heat flow formed by the conductor whereby the heat flow is restricted, or varied as desired. The obstruction consists of any convenient medium of thermal transfer resistance and is preferably located between the surface of the conductor presented in the refrigerant containing space and the opposing surface of the refrigerant. In accordance with the established laws of physics, the thickness and insulating character of this obstruction determines the rate of heat exchange between the conductor and refrigerant and thereby the temperature of the extended heat absorbing surfaces of the conductor, and in turn the temperature of the refrigerated space or material. The nature and structure of the resistance and of the conductor is determined by the character and melting point of the solid refrigerant used and the refrigerating temperatures desired. The conductor and refrigerant containing space are preferably constructed as illustrated so that the solid refrigerant is maintained by gravity in heat exchange relation with the conductor, although any means may be used for maintaining the desired relation.

A principal object of the invention is to provide a method of refrigerating by means of solid refrigerants that shall be more efficient than the prior methods and shall permit of close regulation of the effective refrigerating temperatures.

Another object of the invention is to provide a method of refrigerating by means of solid refrigerants whereby the effective refrigerating temperatures are to be a substantial degree independent of the volume of the refrigerant, and to this latter end, the invention contemplates the provision of a method for materially increasing the refrigerating efficiency of relatively small quantities of a solid refrigerant.

Still another object of the invention is the provision of a method of refrigerating by use of solid refrigerants which will permit a rapid acceleration in the rate of ice meltage or sublimation irrespective of the volume of the refrigerant when the temperatures in the refrigerated area are increased.

A still further object of the invention is to provide a method of refrigeration by means of a solid refrigerant which will permit the refrigeration of practically any desired space whether occupied with a gas (including air), liquid, solid or a combination thereof without actual contact of the refrigerant with the contents of the space whereby when required the refrigerant may be entirely divorced from the refrigerated area.

A still further object of the invention is the provision of refrigerating apparatus for use with a solid refrigerant in which the principal heat transfer to the refrigerant takes place from the refrigerated space or mass to a conductor of high thermal conductivity and extended surface, and thence conductively to a relatively small surface of the refrigerant through a section of the conductor sufficiently large to transmit the required amount of heat for maintaining a predetermined effective refrigerating temperature.

The invention further contemplates the provision of refrigerating apparatus for use interchangeably with solid $CO_2$, solid $H_2O$ or other solid refrigerant, in which the principal heat transfer to the solid refrigerant takes place from the refrigerated area or mass to a conductor of high thermal conductivity and extended surface, thence conductively to a relatively small surface of the refrigerant through a section of the conductor of sufficient size to transmit an amount of heat required for maintaining a predetermined effective refrigerating temperature and in which differences in the melting or subliming temperatures of the different refrigerants may be compensated by means of variable conductor resistances placed between the conductor and the refrigerant.

Again specifically, and as regards the use of solid refrigerants, such as solid $CO_2$, having a relatively low melting point or point of sublimation, another object of the invention is to provide a method of refrigerating with such refrigerants which shall be both relatively efficient and capable of close and accurate regulation of the effective refrigerating temperatures, said temperatures being maintainable even when the volume of the refrigerant has been reduced to relatively small amounts.

A still further object is the provision of refrigerating apparatus for use with solid $CO_2$ or the like in which the effective refrigerating temperature is controllable at least in part by means of insulation set up in an established principal path of heat travel between the refrigerated area or mass and the refrigerant.

A still further object of the invention is to provide a refrigerating apparatus for use with solid $CO_2$ or the like in which provision is made for varying the effective refrigerating temperature by means of an obstruction in the principal path of heat travel between the refrigerated area or mass and the refrigerant and in which said obstruction may be inserted, removed or varied either manually or thermostatically during the refrigerating operation.

A further and more specific object of the invention is the provision of a method of refrigeration by the use of carbon-dioxide "ice" or the like which will permit the automatic maintenance of an approximately constant temperature in the refrigerating chamber under varying conditions of outside atmospheric temperature, of content of refrigerating chamber, and of "ice" supply.

A further object of the invention is the provision of refrigerating apparatus for use with $CO_2$ "ice" or the like in which the principal heat transfer from the refrigerating chamber and its contents to the "ice" takes place convectively from the chamber to a conductor of high thermal conductivity, thence conductively to the "ice", and in which means may be provided for regulating the convection currents in such a manner that an approximately constant temperature may be maintained in the refrigerating chamber.

A further object of the invention is the provision of refrigerating apparatus for use with $CO_2$ "ice" or the like in which the gas resulting from sublimation of the "ice" is retained in essentially gas-tight channels away from the contents of the refrigerating chamber, and in which the gas escapes directly to the outside atmosphere or through piping of high thermal conductivity placed in the top of the refrigerating chamber, thus permitting a secondary heat transfer from the refrigerating chamber and its contents to the escaping $CO_2$ gas.

A further object of the invention is to provide a method of and apparatus for refrigerating by the use of $CO_2$ "ice" or the like whereby an initial rapid chilling of the refrigerating chamber or its contents may be had when desirable by a comparatively rapid melting or sublimation of the "ice", and thereafter the required temperature maintained by a much slower sublimation of the "ice" store.

A further object of the invention is to provide such a refrigerating apparatus for use with $CO_2$ "ice" or the like that a regulated temperature either above or below the freezing temperature of water can be maintained in the principal refrigerating chamber, while in a second chamber the temperature is not exactly regulated, but will always be considerably below the freezing temperature of water as long as the "ice" store is maintained.

A further object of the invention is the production of a refrigerating unit of such character that it may be employed either in household and stationary refrigerators or in the refrigeration of railway cars, motor truck bodies, or other transportation units.

The invention further resides in certain novel and advantageous structural features and details and in specific embodiments representing various applications thereof to different classes of refrigeration, all as hereinafter set forth and illustrated in the attached drawings, in which.

Figure 1:
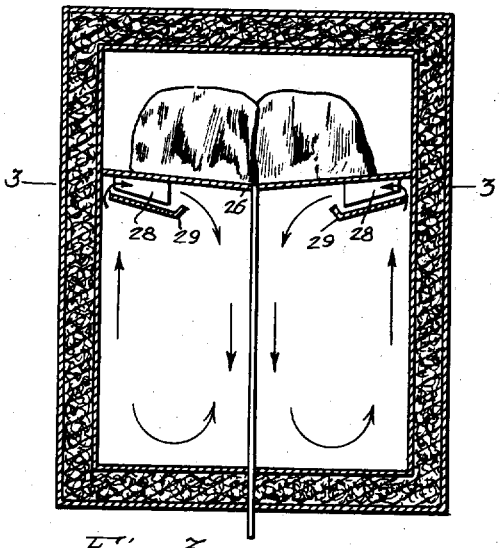
Figure 1 is a diagrammatic sectional view illustrating an embodiment of my invention.

Water ice or solid $H_2O$ is more widely used than any other form of refrigerant. One of the principal drawbacks in the prior methods of using this refrigerant or, in fact, any solid refrigerant is that although any given mass of the refrigerant, no matter how small, has a fixed refrigerating value; yet the smaller the mass becomes, the slower its refrigerating action becomes also. This is due to the fact that the heat is usually either entirely or almost entirely brought to the ice convectively either by air or a liquid, and the amount of heat taken up by the refrigerant, other things being equal, depends directly on the amount of the effective surface contact between the refrigerant and the circulating fluid. Obviously as the ice melts, the surface area becomes less and the refrigerating action slower. In the construction of refrigerating apparatus, this feature, heretofore, has been given no consideration, and no effort has been made to compensate for the rapid decrease in efficiency as the refrigerant loses volume and surface area. As a result, a great deal of ice is constantly being used with very indifferent or inferior results.

One reason that the mechanical household refrigerator has progressed so rapidly is because the ordinary water ice refrigerator cannot maintain satisfactory refrigeration unless it is continually serviced and kept practically full of ice at all times. For the same reason, a large and growing field for refrigeration of foodstuffs in motor transportation has avoided the use of water ice and other solid refrigerants. Practically the only method attempted to improve the efficiency of water ice as a refrigerant has been the use of salt, a method of limited application which apparently cannot be greatly extended.

I have discovered that the principal obstacles to the efficient use of water ice and other solid refrigerants can be largely overcome if the heat from the space or material to be refrigerated is picked up by comparatively extended surfaces of a metal heat conductor, such as copper, aluminum or iron, and transferred through a substantial cross section of the metal conductor directly to a surface of the body of ice with which the metal conductor is either in immediate contact or in suitable conductive relation. I have found that by this method, the ice can be melted at practically a constant rate, thus providing a constant effective refrigerating temperature practically independent of the volume of the refrigerant, and even with extremely small masses of the latter. I have found also that the refrigerant can be melted at an almost inconceivable rate when large amounts of heat are passed over the extended metal surfaces. With a sufficient cross section of the conductor metal, as small as thirty square inches of contact surface with the refrigerant will suffice to melt enough water ice to keep a good household refrigerator below 50° F. even on the top shelf in the warmest weather; and after the doors have been opened as long as three minutes, this refrigerator will return to its original low temperature within twenty minutes or one-half hour. It is essential in the practice of my invention that the solid refrigerant be maintained in conductive relation with a substantial metal conductor having a suitably extended surface area in the refrigerated space.

While the invention is of great importance in conjunction with the use of water ice, it is also of great value in the use of all other solid refrigerants, such as solid carbon dioxide and frozen brine. The apparatus embodying my invention need vary only slightly to meet the requirements of the particular kind of refrigerant and the type of refrigeration required. If, for example, refrigerating temperatures around 35° to 45° F. are desired and water ice is to be used by reason of its cheapness and availability, then a relatively large amount of extended conductor or fin surface will be required because of the small temperature differential between the water ice and the temperature required; while the same temperatures can be secured by use of solid carbon dioxide with considerably less surface area by reason of the fact that with solid carbon dioxide the conductor can be chilled to almost any temperature required down to say minus 50° F., and accordingly a relatively large temperature differential be maintained between the conductor and the refrigerated space. Obviously if temperatures are wanted near or below the melting point of water ice, then some other solid refrigerant may be used with a sufficiently low melting or subliming point that the conductor can be put at a temperature affording the differential required to maintain the refrigeration wanted. Frozen brine may be used especially when put up in small and easily handled units in liquid-tight metal containers. The heat transferred from the conductor to the solid brine through the metal container, however, is not as constant and controllable as in the direct contact of water ice with the conductor or the contact of carbon dioxide ice with the conductor through a known amount of conducting resistance, as hereinafter more specifically set forth. However, as the frozen brine can be provided with a melting point practically anywhere between 32° F. and considerably below zero and has now come into more common use and also is comparatively cheap, it is apparent that it will have a limited use as a solid refrigerant means in my method of refrigeration. Of course, frozen brine directly in solid state can be used in the same way as water ice or carbon dioxide ice by permitting the melted brine to drain off.

When using solid refrigerants such as carbon dioxide ice with a temperature considerably below the melting point of water ice, the use of predetermined known conductor resistances interposed between the conductor and the refrigerant is an important part of my method, as it affords a large degree of control over the action of the refrigerant and a quick convenient method of varying the temperature of the extended conductor surface, and thus the effective refrigerating temperature.

It will be understood that for maximum control of refrigeration, with this type of refrigerant it is desirable to limit so far as feasible transfer of heat from the refrigerated space or mass to that passing through the conductor. This can be accomplished by providing adequate insulation preventing transfer by radiation or by other than conduction through the selected conductor. By thus establishing a principal and practically sole path of transfer and utilizing in conjunction therewith suitable known resistances, a substantially perfect control may be obtained. This method of control also affords a simple method for providing apparatus suitable for use with refrigerants such as water ice and carbon dioxide ice having widely different melting points. Thus a single refrigerating apparatus can be built that can use as a refrigerant either carbon dioxide or water ice or frozen brine, or, in fact, any solid refrigerant, and that can maintain practically any required temperature under constant outside temperature conditions within the limits of the particular refrigerant used by a simple manipulation of conductor resistance interposed between the conductor and the refrigerant, and by providing in the same apparatus either manually or thermostatically-operated means to regulate the convection currents from the extended conductor surfaces or fins, the required temperature can be maintained irrespective of normal outside temperature variations.

Figure 2:
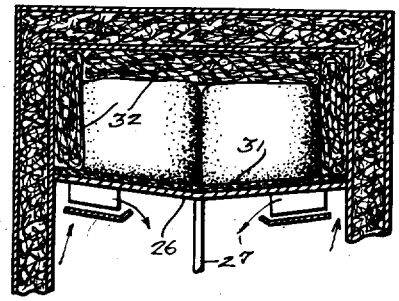
Fig. 2 is a fragmentary sectional view of the embodiment shown in Fig. 1 modified for use with solid $CO_2$ as the refrigerant.
Figure 3:
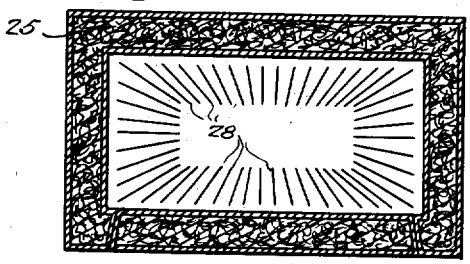
Fig. 3 is a section on the line 3—3, Fig. 1.

In Figs. 1 to 4, inclusive, I have illustrated application of the invention to a refrigerator of the "overhead icing" type. In this instance, the casing 25 has in its interior and upper portion a refrigerant-supporting shelf 26 which inclines from opposite sides towards the center whereby a solid refrigerant placed thereon has a tendency to gravitate toward the center. From the depressed mid-section a drain pipe 27 extends downwardly and runs to the exterior of the casing. Projecting from the under side of the shelf and towards its outer edge and extending in a continuous series completely around the four sides of the shelf, as illustrated in Fig. 3, is a plurality of fins 28, and beneath these fins is a continuous baffle plate 29. Convective circulation of the air within the casing is set up as indicated by the arrows, the air passing between the fins and in contact with the surface of the conductor shelf 26.

In Fig. 2, the same construction is shown as modified for use with solid carbon dioxide. In this instance, conductor resistance in the form of sheets 31 of heat-insulating character is interposed between the ice and the conductor shelf 26. Also the solid carbon dioxide is completely surrounded by insulation 32. The refrigerant is in conductive relation with the conductor 26 through the resistance 31, which is of predetermined value and selected to maintain a predetermined effective refrigerating temperature. Gases of sublimation may escape through the pipe 27. It will be noted both as regards the use of water ice and dry refrigerant, a conductive relation between the refrigerant and the conductor 26 is maintained.

Figure 4:
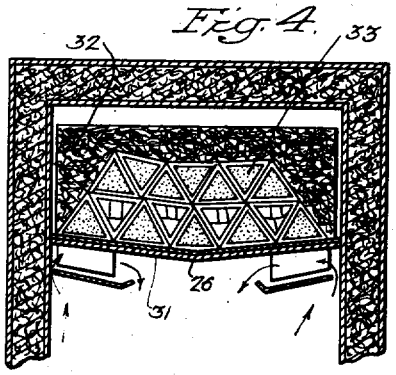
Fig. 4 is a fragmentary sectional view similar to that of Fig. 2 but illustrating the apparatus used with a refrigerant composed of frozen brine.

In Fig. 4, I have illustrated the same apparatus used with frozen brine containers 33. These containers with the brine in the solid state are supported upon the shelf 26, suitable conductor resistance 31 being inserted between the conductor 26 and the said containers, and the latter also being surrounded by suitable insulation 32. In this instance, the drain pipe from the shelf 26 is eliminated.

Figure 5:
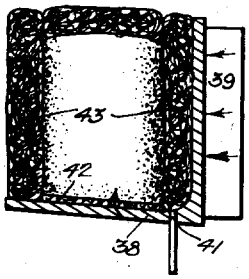
Fig. 5 is a sectional view illustrating an embodiment of my invention modified for use with solid $CO_2$.

Fig. 5 shows a type of conductor of primary value in connection with carbon dioxide ice. This unit comprises an angular casting 38 of aluminum with copper fins 39. The ice-supporting wall is slightly inclined towards the juncture with the upright wall, and in the angle outlets 41 are provided for elimination of the gases of sublimation. The principal heat transfer in this instance takes place through the thin copper fins, down the upright side of the casting to the bottom or ice-supporting wall. Interposed between the solid carbon dioxide and this lower wall is a suitably selected conductor resistance 42, and the ice is also surrounded by suitable insulation 43.

Figure 6:
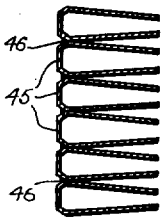
Figs. 6, 7, 8, 9 and 10 are fragmentary sectional views illustrating different types of fin construction suitable for use in the practice of my invention.

In Figs. 6 to 10, inclusive, I have illustrated various types of fin conductors which have been found suitable in the practice of my invention. The form of conductor illustrated in Fig. 6 is one that can be conveniently used for household refrigeration purposes, this being made up from a number of bent copper sheets 45 soldered together at the points designated 46 so as to present a substantially flat conductor plate surface for contact with the solid refrigerant and a considerably extended fin surface for contact with the convection currents.

Figure 7:
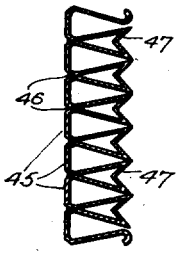

Fig. 7 shows a similar construction in which the outer ends 47 of the projecting fin portions are turned inwardly toward each other so as to afford the same amount of contact surface in a more restricted space.

Figure 8:
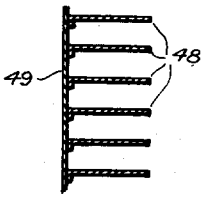

Fig. 8 shows a more efficient type of conductor in which thin copper fins 48 are soldered or welded to a heavy copper conductor plate 49.

Figure 9:
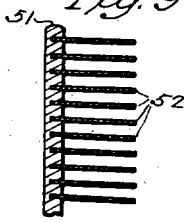

Fig. 9 shows a still more efficient but more expensive form of conductor consisting of a solid aluminum plate 51 with thin copper fins 52 secured to the aluminum plate by casting the latter on the fins.

Figure 10:
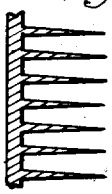

Fig. 10 shows an all-aluminum fin conductor formed of a single casting.

Figure 11:
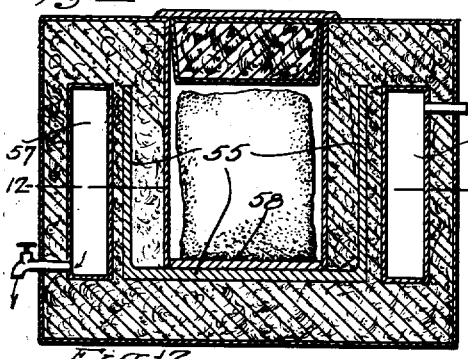
Fig. 11 is a diagrammatic sectional view illustrating a still further embodiment of my invention.
Figure 12:
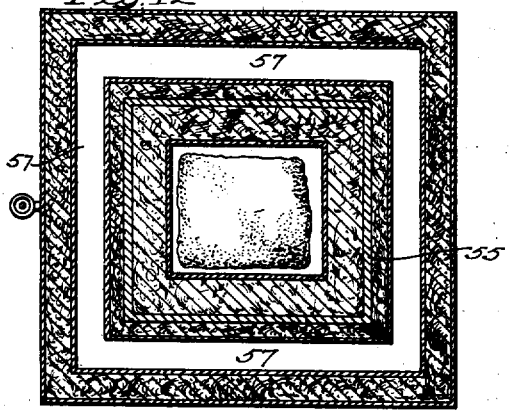
Fig. 12 is a section on the line 12—12, Fig. 11.

In Fig. 11, I have illustrated my invention as applied to a water cooler employing solid carbon dioxide as the refrigerating medium. In this instance, the conductor forming an essential part of the device consists of a solid aluminum or copper receptacle 55 which is embedded in solid insulation 56. A chamber 57 is provided in the insulation 56 for the water or other liquid to be cooled. This chamber, as shown in Fig. 12, extends completely around the sides of the receptacle 55, but is spaced a sufficient distance from the said conductor to maintain a desired temperature of the liquid for any predetermined temperature of the conductor. This temperature in turn is controlled by the thickness of conductor resistance 58 interposed between the solid carbon dioxide ice and the bottom wall of the conductor. With an arrangement of this character, I have found it possible to maintain substantially any desired temperature of the liquid within the container 57 by simple variation in the thickness of the conductor resistance 58 which modifies the conductive relation between the conductor 55 and the refrigerant. It will be noted that in this instance the conductor while having the necessary extended surface is not provided with fins, and that further the surfaces of the conductor are not in direct contact with the liquid to be cooled, but are in conductive relation therewith through the insulation separating the walls of the liquid container from the said conductor.

Figure 13:
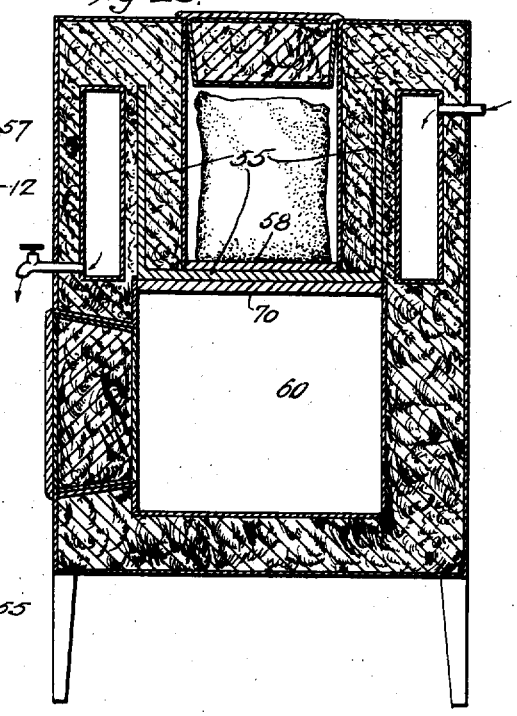
Fig. 13 is a diagrammatic sectional view illustrating another embodiment of the invention.

Fig. 13 shows a similarly constructed water cooler with the addition of a storage space 60 located below the bottom of the conductor, it being possible to maintain this space at practically any required temperature by variation in the thickness of the insulating member 70 which constitutes conductor resistance between the space and the bottom of the conductor 55.

Figure 14:
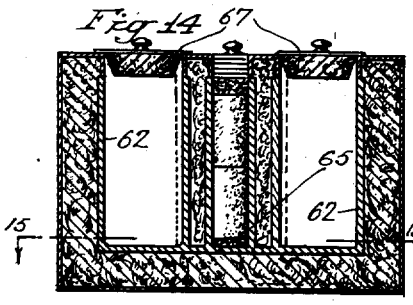
Fig. 14 is a diagrammatic sectional view illustrating application of the principles of my invention to the construction of a container for frozen product such as ice cream.
Figure 15:
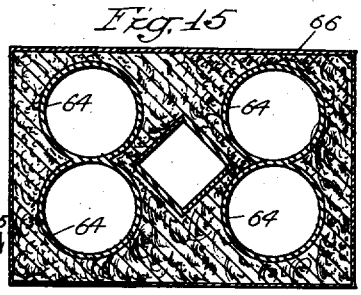
Fig. 15 is a section on the line 15—15, Fig. 14.

A more or less similar form of conductor is shown in Figs. 14 and 15, which show a cabinet suitable for use with solid carbon dioxide for storing ice cream, frozen foods or the like. In this instance, the conductor consists of a solid aluminum casting 62, this casting comprising a base 63 and four cylindrical vertical containers 64. In this instance, the walls of the portions 64 constitute the necessary extended surface area, provision being made for supporting the refrigerant upon the base between the said portions 64, as shown in Fig. 15. For this purpose, the refrigerant may be supported within a vertical metallic or other container open at the bottom to permit the ice to come into conductive relation with the base portion 63 of the conductor, from which it may be separated by a suitable conductor resistance member 65 selected to afford a desired temperature within the receptacle 64 in which the refrigerated material is stored. The entire conductor casting is surrounded by a suitable insulating casing 66, and provision is made in the form of removable cover plates 67 for affording access to the interior of the container 64.

Figure 16:
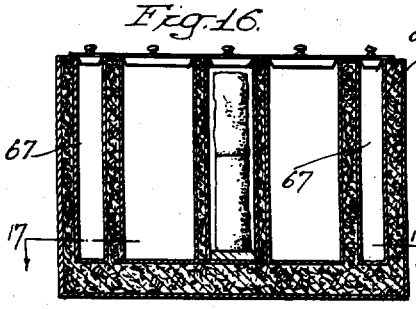
Fig. 16 is a diagrammatic sectional view illustrating a modification of the embodiment illustrated in Fig. 14.
Figure 17:
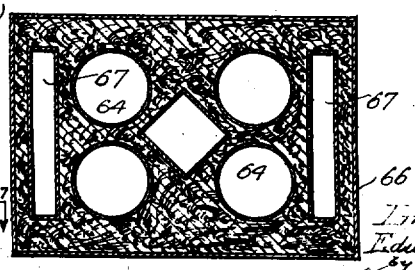
Fig. 17 is a section on the line 17—17, Fig. 16.

In Figs. 16 and 17, I have illustrated a similar type of refrigerating apparatus which in addition includes storage chambers or receptacles 67 embedded in the insulating casing 66 in suitably spaced relation to the sides of the container 64, these compartments 67 being readily kept at a non-freezing temperature and being suitable for holding water or other substances or materials at a relatively low but non-freezing temperature.

Figure 18:
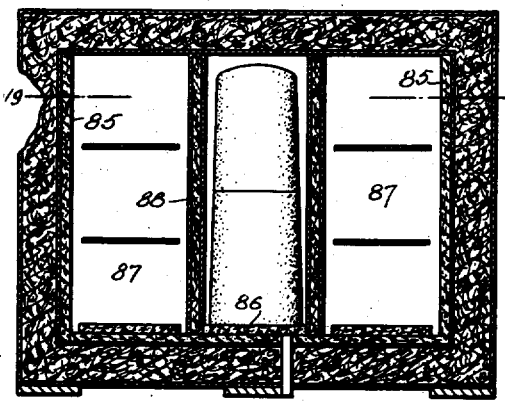
Fig. 18 shows another form of refrigerator storage cabinet embodying my invention.
Figure 19:
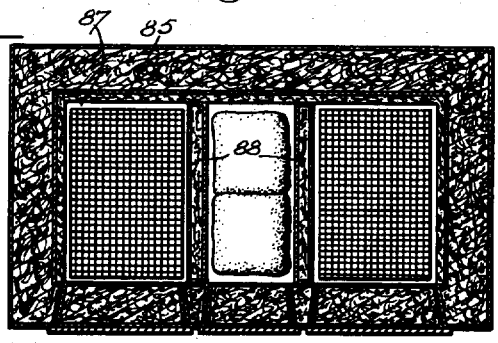
Fig. 19 is a section on the line 19—19, Fig. 18.

In Figs. 18 and 19, I show a form of refrigerating storage box convenient for use on store counters and under similar conditions. In this instance, the storage space is surrounded on three sides and the bottom by the conductor 85, and the heat is picked up as it comes through the walls of the storage box and also from the contents and is conducted to the bottom of the conductor, and thence to the refrigerant shown as blocks of solid carbon dioxide, which is separated from the conductor by the conductor resistance 86 generally used with this refrigerant. It will be noted that the chamber which holds the refrigerant is separated from the storage chambers 87, 87, by insulation 88, and by varying the thickness or character of this insulation, this type of refrigerator can be used for a wide variety of temperatures extending downwardly considerably below zero.

Figure 20:
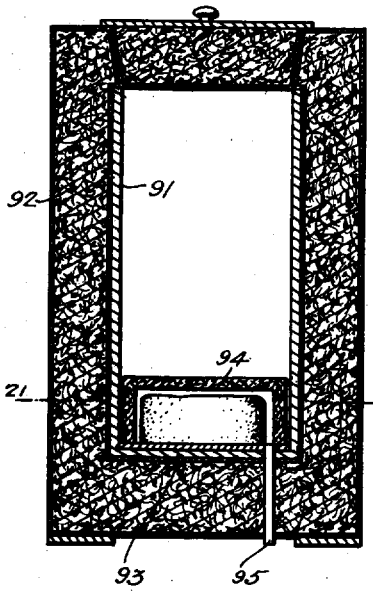
Fig. 20 is a vertical sectional view showing a further form of single chamber container made in accordance with my invention.
Figure 21:
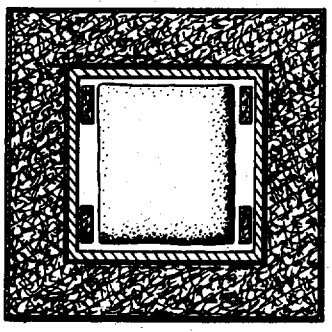
Fig. 21 is a section on the line 21—21, Fig. 20.

Figs. 20 and 21 illustrate a one-compartment ice cream or frozen storage cabinet in which the metal conductor made of copper or aluminum takes the form of a rectangular receptacle 91 surrounded by suitable insulation 92. In this instance, the $CO_2$ ice or other refrigerant is placed on the base of the conductor with the usual interposed conductor resistance 93. A small removable shelf 94 is placed over the ice to support the ice cream can or other materials to be stored. A vent 95 affords escape of the sublimed gases or meltage.

Figure 22:
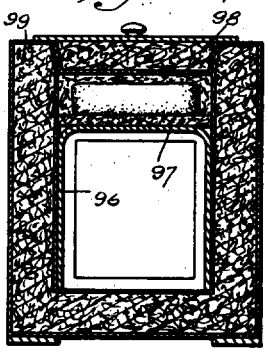
Figs. 22 and 23 are vertical sectional views illustrating my invention as embodied in relatively small refrigerator containers.

In the embodiment shown in Fig. 22, a small storage box adapted for use primarily with $CO_2$ ice is shown. In this instance, the conductor takes the form of a rectangular container 96 which is open at one side, and provision is made for placing the refrigerant on the top wall of the conductor as illustrated, the usual conductor resistance 97 being provided. Access to the ice chamber is afforded through a removable cover 98 in the insulating casing 99, and access to the refrigerating chamber is provided by a suitable removable cover member (not shown) located in the side of the said casing.

Figure 23:
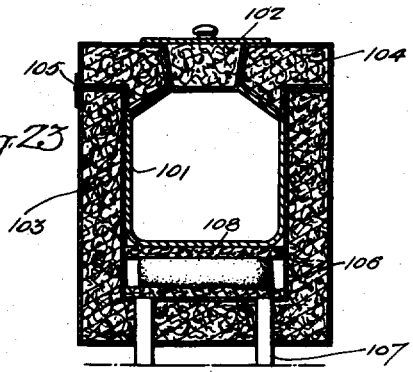

Fig. 23 shows still another form of small storage box in which the conductor 101 is in the form of a removable storage bin, this conductor being made preferably of copper or aluminum. Access to the storage space is afforded through a removable cover 102 in the top of the insulating casing 103, and this top portion 104 of the casing is also hinged at 105 to permit the entire top to be turned back to permit removal of the conductor 101. The refrigerant in this instance is supported upon a shelf 106 which is movable within the casing and which has legs 107 which project through openings in the bottom of the casing and rest upon the floor or other supporting surface. As the $CO_2$ ice sublimes, the entire casing settles downwardly around the shelf 106, whereby the refrigerant is maintained in continuous conductive relation with the bottom of the conductor 101. The usual conductor resistance 108 is interposed between the refrigerant and the bottom of the conductor.

Figure 24:
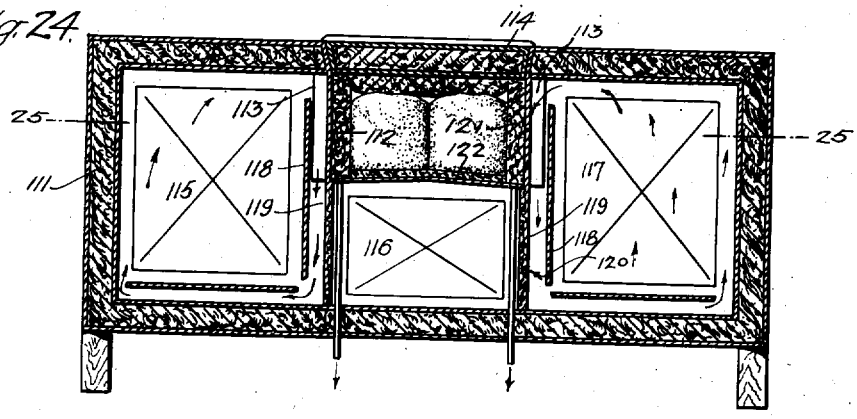
Figs. 24 and 25 are, respectively, a vertical sectional view and a section taken on the line 25—25, Fig. 24, illustrating a table or cabinet type of refrigerator made in accordance with my invention and in condition for use with solid carbon dioxide or other refrigerant of relatively low melting point.
Figure 25:
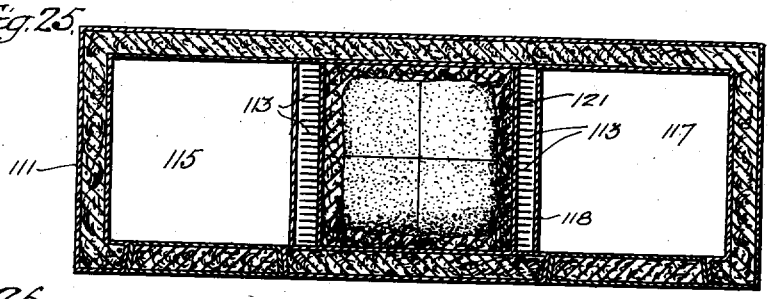

In Figs. 24 and 25, I have illustrated a large table or cabinet type of refrigerator adapted for use either with $CO_2$ ice or water ice and in which provision is made for obtaining in the three separate compartments three different temperatures, when $CO_2$ ice is used, or of two temperatures when water ice is employed. This refrigerator consists of an outer insulated casing 111 having in the top a chamber for a refrigerant, the opposite sides and the bottom of which are constituted by a channel-shaped conductor 112. The side walls of this conductor are provided with outwardly projecting fins 113, and the bottom wall is slightly elevated towards the center to create a tendency of the solid refrigerant to move by gravity towards the vertical fin walls. Access to this refrigerating chamber is had through a removable cover 114. Three refrigerating chambers are provided numbered 115, 116 and 117, respectively, the chamber 116 being located directly below the refrigerant chamber. Baffles 118 in the chambers 115 and 117 extend vertically and preferably in contact with the outer edges of the fins 113 whereby a convective circulation is set up in which the air moves downwardly between the fins and against the side walls of the conductor. The chamber 116 is separated from the other chambers by insulating walls 119, and in one or both of the chambers 115 a valve 120, which may be operated manually or automatically from a suitable thermostatic actuator, is provided for controlling the movement of the convection currents downwardly past the walls and fins of the conductor. Where carbon dioxide ice is used, the refrigerant is surrounded in the refrigerating chamber on four sides and the top by suitable insulation 121, while the ice is separated from the bottom of the conductor by means of suitable conductor resistance 122. The temperature in the chamber 116 is controlled by the thickness and character of the conductor resistance, whereas the temperatures in the compartments 115 and 117 are controlled not only by the conductor resistance, but also by the thickness and character of the insulation 121, and may be still further controlled by manipulation of the valve 120.

Figure 26:
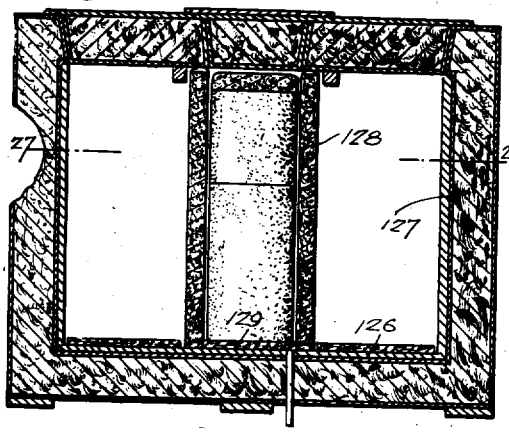
Fig. 26 is a vertical sectional view through a small type of shipping refrigerator container made in accordance with my invention.
Figure 27:
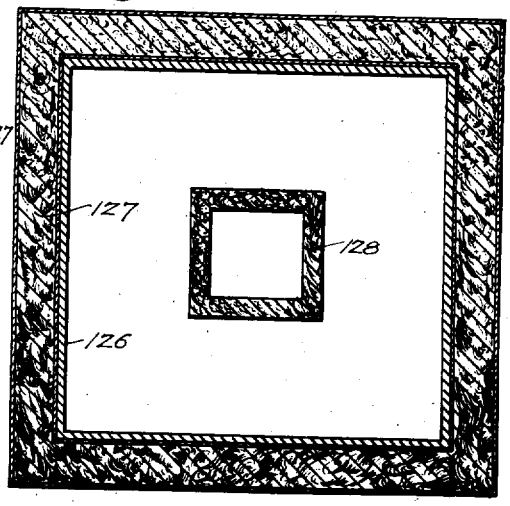
Fig. 27 is a section on the line 27—27, Fig. 26.

Figs. 26 and 27 illustrate a small shipping refrigerator box in which the conductor 126, which may suitably be made of copper or aluminum, in effect lines the four walls and bottom of the casing 127. This form of refrigerator is particularly suited for use with $CO_2$ ice, and it will be noted that the usual protective insulation 128 and conductor resistance 129 are provided.

Figure 28:
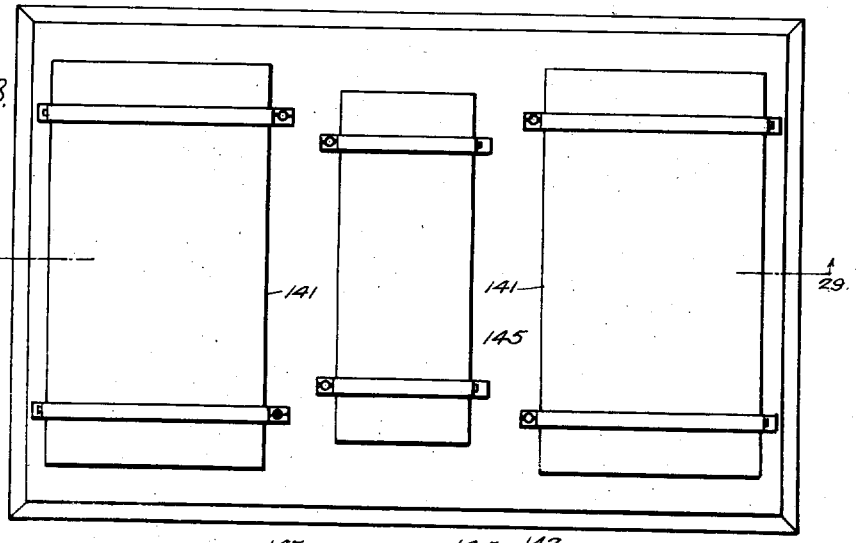
Fig. 28 is a plan view of another form of refrigerator employing my method and apparatus.
Figure 29:
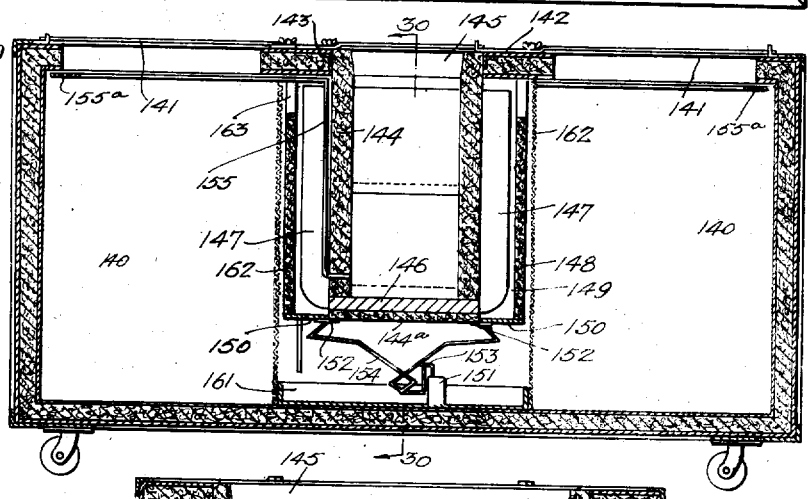
Fig. 29 is a section on line 29—29 of Fig. 28.
Figure 30:
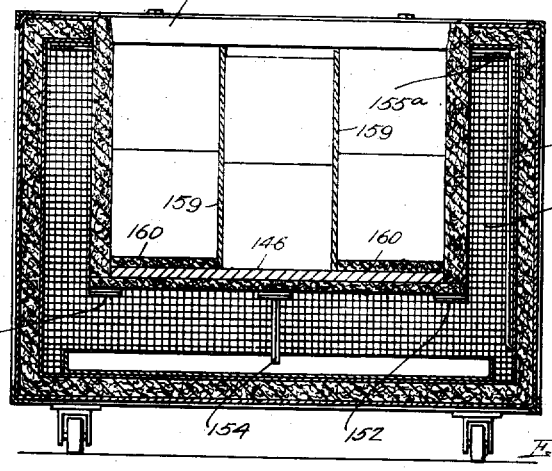
Fig. 30 is a section on line 30—30 of Fig. 29.
Figure 35:
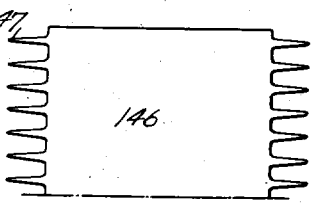
Fig. 35 is a fragmentary bottom plan view of a conductor plate constructed for use in my apparatus.
Figure 37:
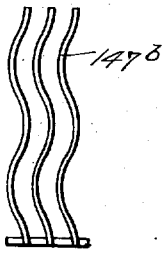
Fig. 37 is a fragmentary side elevation of the plate illustrated in the vertical corrugation of the vanes for the same purpose.
Figure 36:
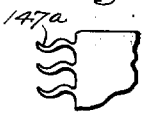
Fig. 36 is a fragmentary modified view of a slightly modified form of a conductor plate wherein the vanes are transversely corrugated to increase the conduction surface thereof.

Referring to Figs. 28, 29 and 30, numeral 140 designates a refrigerating chamber having access doors 141 in the upper wall 142 thereof. The chamber walls are, of course, insulated in any usual or preferred manner and the upper wall 142 was formed therein an opening 143. Extending into the refrigerating chamber through this opening is an insulated cabinet 144 approximately gas tight having an open top closed by an access door 145. The bottom wall 144*a* of this cabinet has imposed thereon a conductor plate 146 which may be conveniently constructed from copper, aluminmum or some other metal having a suitably high factor of thermal conductivity. The edges of this plate project through the cabinet walls and are provided with vertically-extending vanes 147 projectng upwardly along the side walls of the cabinet and preferably constructed integrally with the plate 146. These vanes, as evidenced by Figs. 35, 36 and 37, may be either plane, as in Fig. 35, or transversely or longitudinally corrugated, as indicated at 147 and 147*b*, respectively, in Figs. 35 and 36, the latter constructions providing an increased surface for contact with convection currents.

Opposing the outer edges of the vanes are insulated walls 148 which combine with the cabinet to provide channels 149 through which convection currents may pass. The lower ends of these channels are closed by valves 150 regulated through a thermostat 151. In the present instance, the valves are illustrated as pivotally connected to the lower wall of the cabinet at 152 and connected to the movable element 153 of the thermostat by a linkage generally designated at 154.

From the interior of the cabinet a vent tube 155 is led through the wall of the refrigerating chamber 140. This vent tube is made of metal of a high thermal conductivity, preferably copper, and includes a coil 155*a* disposed in chamber 140 for contact with the convection currents of the chamber, preferably near the top of the chamber and where warm "pockets" are liable to occur. The outlet of the vent tube is placed below the inlet in order to induce a ready flow of $CO_2$ gas by siphoning, and is preferably equipped with a regulating valve which may be conveniently housed in a recess formed in the wall of the cabinet.

The interior of the cabinet is preferably subdivided into a plurality of sections by vertically extending partitions 159 constructed of insulating material. These partitions are in the present instance illustrated as two in number so that three "ice" spaces are formed. The bottoms of these "ice" spaces are formed by the plate 146 and upon the plate in the bottom of each "ice" space insulation 160 may be disposed between the "ice" and the plate, the thickness of this insulation varying in accordance with the conditions under which the refrigerator is to be employed. Insulation 160 is removable and of variable thickness and it will be obvious that if two of the compartments have in the bottoms thereof insulation 160 of a considerable thickness while a third compartment has no insulation as suggested in Figs. 28, 29 and 30, or a relatively thin insulation as suggested in Fig. 34 the "ice" of this latter compartment will be sublimed more rapidly than that in the remaining compartments so that the "ice" of this compartment acts as an initial chilling supply while that of the remaining compartments acts as a reserve supply. Thus the first mentioned "ice" supply serves to rapidly reduce the temperature of the chamber when initially placed in operation or when a rapid reduction of temperature therein is necessary following an opening of the access doors 141.

If, for example, goods are placed in the refrigerator at their normal temperature and must be rapidly chilled, the insulation 160 may be completely removed from one of the compartments so that the "ice" in this compartment will act very rapidly to reduce the temperature of the chamber and to chill the goods to the desired point. The desired temperature having been attained, the "ice" in the remaining compartments is held in reserve to maintain this temperature, thus materially increasing the period over which refrigeration is possible and particularly adapting the apparatus for use in transportation of perishable goods where facilities for replenishing the "ice" store are poor.

When precooled products are placed in the refrigerating chamber, then the bottoms of all of the compartments may be provided with insulation, thus providing a maximum period of refrigeration for a given "ice" supply. By varying the extent to which the bottoms of the compartments are insulated from conductor plate 146 a limited control of the rate of melting of the "ice" may be obtained and thereby a limited control of the temperature of the storage chamber and contents secured.

A drip pan 161 is preferably disposed beneath the cabinet for the reception of water, resulting from defrosting of vanes 147 and the storage spaces of the refrigerating chamber are preferably separated from the cabinet spaces by foraminous screens 162.

The principal amount of the heat used in melting, or subliming the "ice" is transferred by convection from the storage chamber and its contents to the vertically extending vanes 147, thence conductively to the plate 146, thence conductively directly, or through insulation 160 to the "ice". A smaller amount of heat is transferred by conduction through the insulations of the "ice" cabinet and walls 148, and by internal convection currents within the "ice" cabinet and space 147a. Control of the temperature of the storage chamber and contents is secured in part by predetermined fixed variations of the size and character of the conduction plate 146 and vanes 147, and of the insulations 144, 144a, 148, 150 and the insulated chamber walls and doors. However, actual changes in temperature in the contents of the storage chamber during reduction to a desired level, as well as climatic and artificial changes in temperature outside the storage chamber may require a further means for securing a constant temperature inside the chamber. This is achieved by the thermostatic or manual control of the convection currents through channels 149 and transferring more or less heat to conduction vanes 147 and plate 146. By these several means a variation of the rate of subliming or melting the carbon-dioxide "ice" of as much as 1,000% can be attained which I believe is sufficient to accomplish the objects of this invention.

Figure 31:
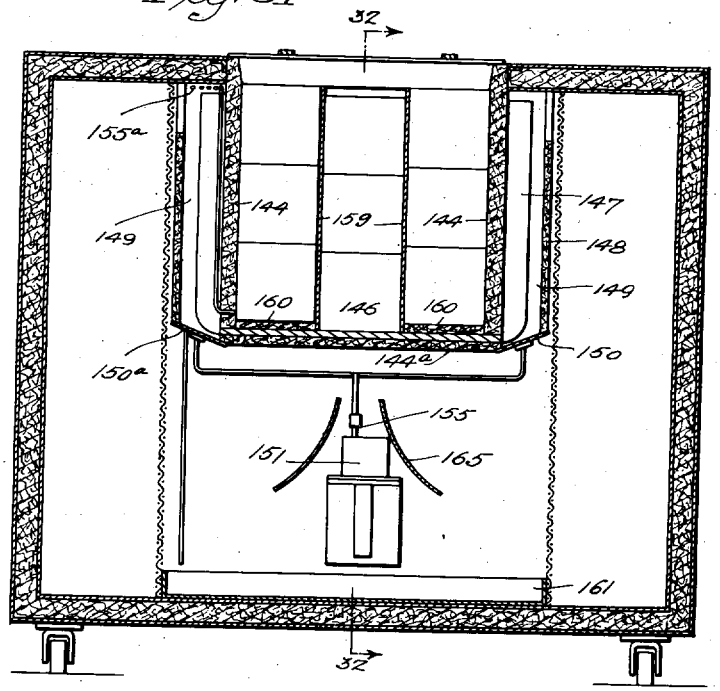
Fig. 31 is a vertical sectional view through a modified refrigerator structure.
Figure 32:
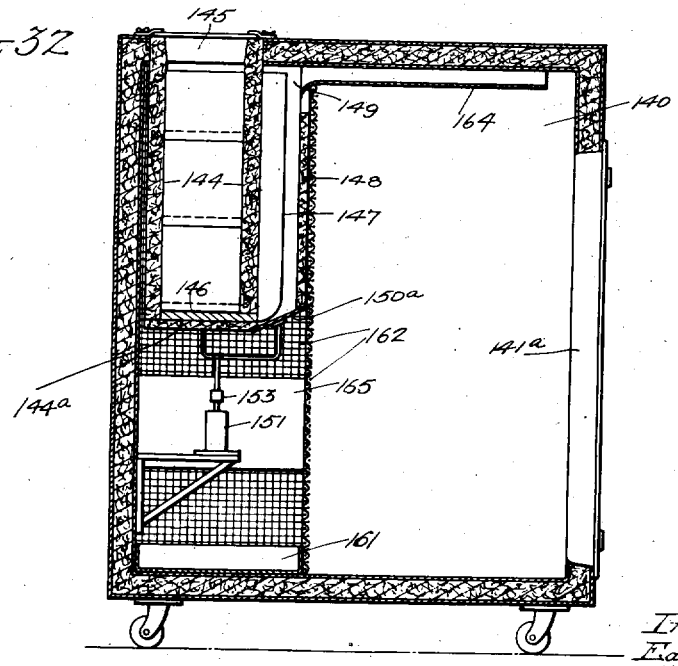
Fig. 32 is a section on line 32—32 of Fig. 31.

The structure of Figs. 31 and 32 is substantially identical with that of Figs. 28, 29 and 30, with the exception of the fact that the chamber 140 has its access door 141a mounted in the side wall thereof and that communication between the channels 149 and the storage space in the upper ends of these channels instead of being made only through openings 163, formed in the insulating walls, includes one or more ducts 164 opening at the inner end through the wall of channel 149 and having the outer end disposed adjacent to the wall of the chamber 140 or where warm pockets are likely to occur. A further slight modification of the control of the channel is employed in that the valves 150a instead of being supported by the cabinet, as in Figs. 28, 29 and 30, are directly supported from and secured to the movable member 153 of the thermostat. The thermostat has further associated therewith baffle shields 165 which prevent chilled air, descending from the convection channels, from directly contacting thermostat 151 and thus causing too early a closing operation of the valves 150a.

Figure 33:
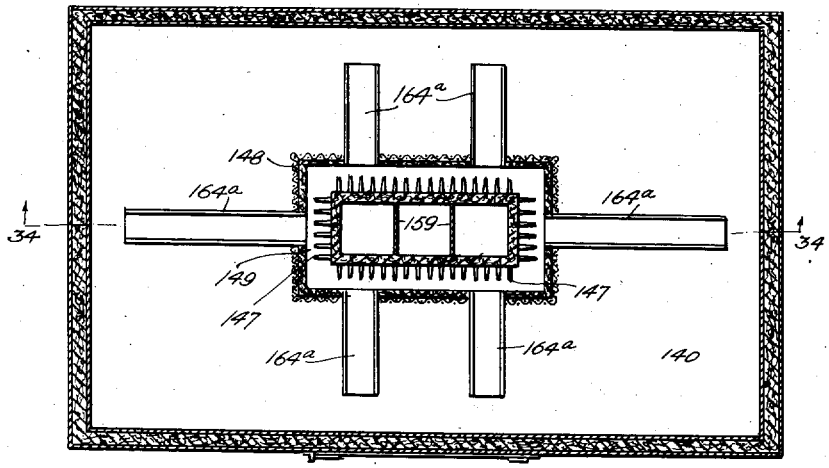
Fig. 33 is a horizontal sectional view of a further modified form of the invention taken on the line 33—33 of Fig. 34.
Figure 34:
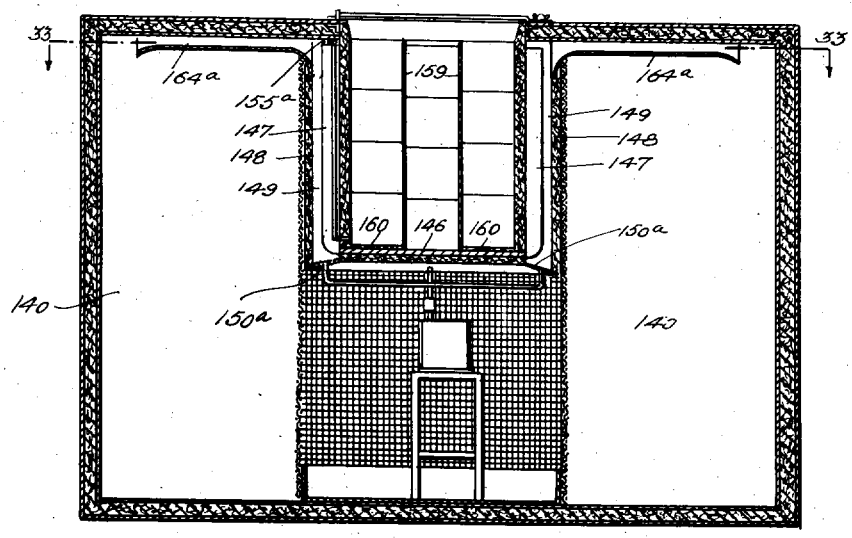
Fig. 34 is a section on line 34—34 of Fig. 33.

The form shown in Figs. 33 and 34 is identical with the structure of Figs. 31 and 32, with the exception of the fact that conduction vanes are provided entirely about the cabinet walls and entrance to the convection channels is largely through ducts 164a, the intake ends of which are disposed adjacent to the vertical walls of the chamber 140.

Figure 43:
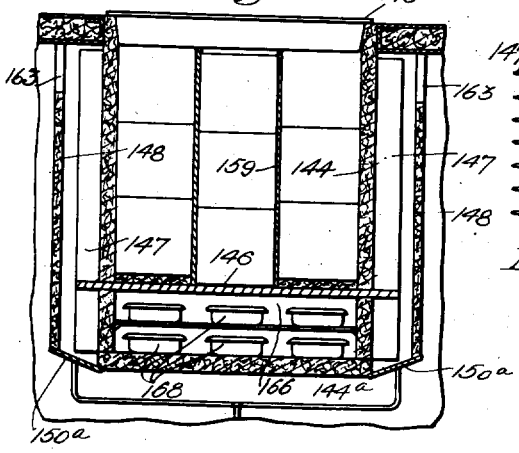
Fig. 43 is a fragmentary vertical sectional view illustrating a modification of the invention combining a structure similar to that illustrated in Figs. 28 to 34 with a structure such as illustrated in Figs. 38 to 41.
Figure 38:
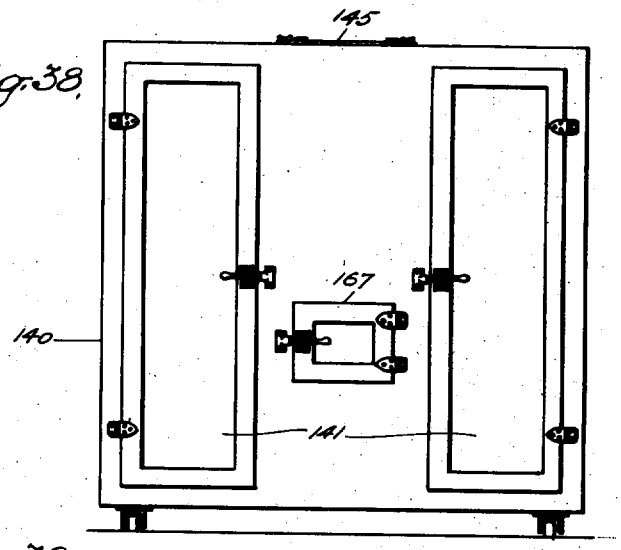
Fig. 38 is a front elevation of a household refrigerator constructed in accordance with my invention and adapted for making water ice cubes and storage of frozen products.
Figure 39:
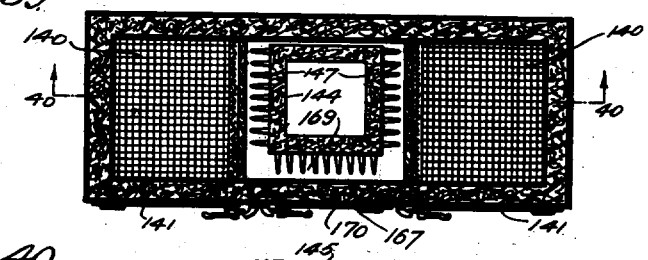
Fig. 39 is a horizontal sectional view on line 39—39 of Fig. 40.
Figure 40:
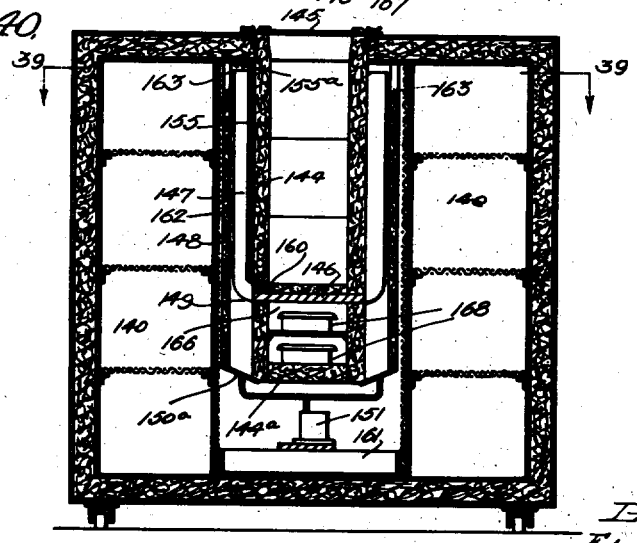
Fig. 40 is a vertical sectional view on line 40—40 of Fig. 39.

In Figs. 38, 39 and 40, I have illustrated refrigeration apparatus particularly adapted for household uses and embodying means for producing water ice cubes and for storing frozen products. From an inspection of Fig. 40, it will be noted that the conductor plate 146, which forms the false bottom of the cabinet, instead of being in direct contact with the insulating bottom 144a thereof is in vertical spaced relation thereto, with the result that a compartment 166 is produced therebeneath, which is conductively connected with the "ice" compartment by the plate 146. This compartment 166 is accessible through a door 167 mounted in the wall of chamber 140 and is adapted for the reception of freezing pans 168 for the formation of ice cubes or used in freezing confections or for storing frozen products. The wall of the cabinet is preferably offset inwardly, as at 169, above the door opening, so that the body of the cabinet may be spaced from the front wall 170 of the chamber a sufficient distance to permit the provision of radiation vanes 147 between the cabinet and chamber walls thereabove. In this illustration, where the apparatus is maintained for household use and supplies of "ice" are readily available, necessity for a construction permitting more than one column of "ice" is eliminated and the entire supply may rest at its lower end directly upon the plate 146, or upon portable insulation 160 as described above. The ice cube and frozen storage compartment 166 may, however, be conveniently combined with structures embodying several vertical columns of "ice" as suggested in Fig. 43.

Figure 41:
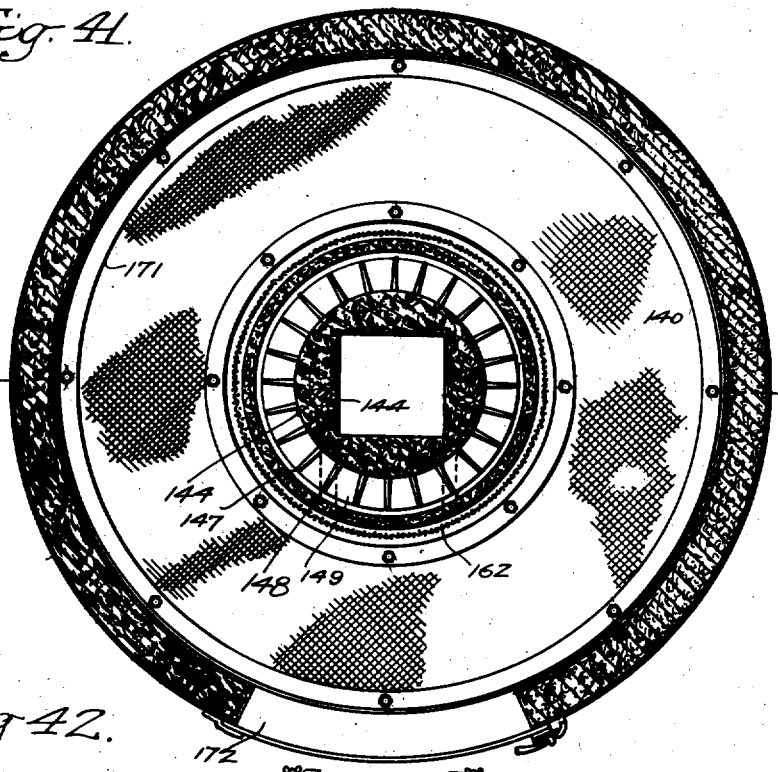
Fig. 41 is a horizontal sectional view taken on line 41—41 of Fig. 42 and illustrating a modification of a structure, such as shown in Figs. 38 to 40, to produce a circular refrigerator having rotating shelves.
Figure 42:
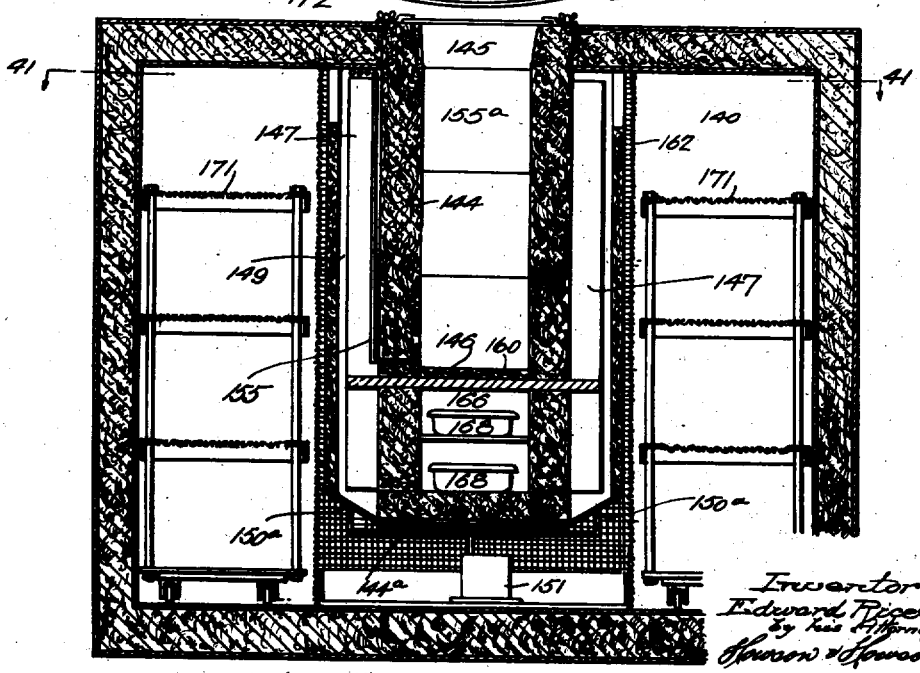
Fig. 42 is a section on the line 42—42 of Fig. 41.

In Figs. 41 and 42, the construction of Figs. 38 to 40 is modified to permit its adaptation to a circular refrigerator having rotating shelving units 171, the rotation of which will bring storage into alignment with an access door 172 which aligns with the access door of the freezing chamber 166.

Figure 44:
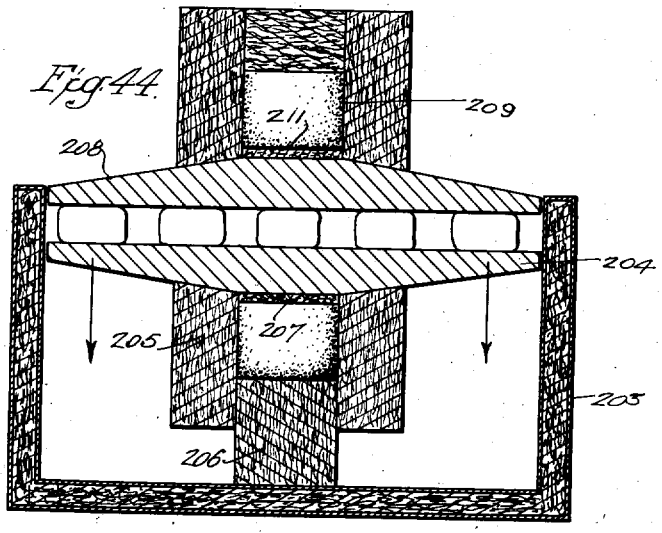
Fig. 44 is a diagrammatic vertical sectional view illustrating apparatus for quick freezing of meat, fish and other foodstuffs also embodying my invention.

In Fig. 44 is illustrated an apparatus made in accordance with my invention adapted for quick freezing of meat, fish and similar products. A casing 203 has established therein a conductor plate 204, this plate being adapted to slide vertically in the casing. Depending from the plate 204 is an insulating apron 205 which fits more or less closely around a post or ram 206 also preferably of insulating material. When a refrigerant is placed between the upper end of the ram 206 and the plate 204 and within the space surrounded by the apron 205, it will be apparent that the plate will be supported by the refrigerant, and that as the latter melts or sublimes, the plate will move downwardly, so that the conductive relation between the plate and the refrigerant will remain constant. Where a refrigerant such as solid $CO_2$ is employed, temperatures may best be controlled by a conductor resistance 207 inserted between the refrigerant and the plate as illustrated. An upper plate 208 is provided having at the top an enclosed insulated space 209 for reception of a refrigerant which is held in conductive relation to the plate 208. This plate 208 rests upon the material to be frozen, which latter in turn rests upon the plate 204, so that the material is confined between the two cold plates, insuring rapid freezing. Where a refrigerant of the type of solid $CO_2$ is used, it is preferred to employ a conductor resistance 211 which is interposed between the plate 208 and the refrigerant as illustrated.

Figure 45:
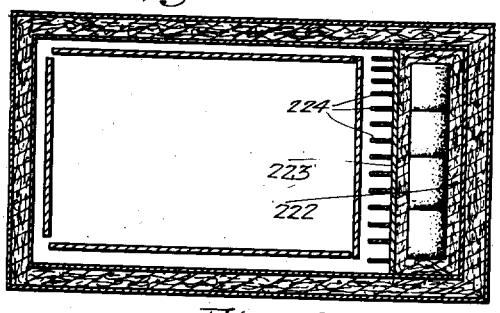
Fig. 45 is a horizontal sectional view.
Figure 46:
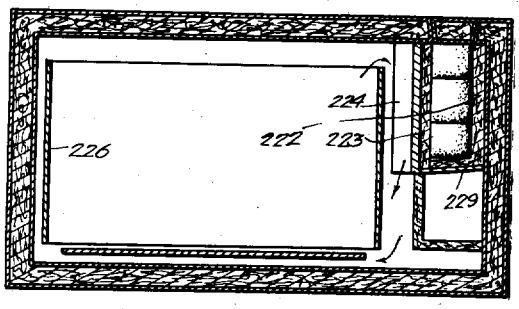
Fig. 46 is a vertical sectional view on the line 46—46, Fig. 45, illustrating my invention as applied to refrigeration of relatively small truck bodies.

In Figs. 45 and 46, a refrigerating system is illustrated suitable for small truck bodies and the like and adapted for refrigeration with practically any type of solid refrigerant. The body 221 in this instance has a chamber 222 at one end and in the upper portion for reception of the refrigerant, the bottom and front wall of this space being constituted by a suitable angular conductor plate 223, and the said front wall being provided with fins 224 which project into the interior or refrigerated area of the truck. The space directly under the bottom of the conductor plate 223 is enclosed by a partition 225 and constitutes a cold compartment whose temperature may be maintained at a relatively low point. A false wall or baffle 226 is provided in the interior of the body which forms a channel for the circulation of the convection currents, as indicated by the arrows, the circulating air passing downwardly over the upright face of the conductor 223 and between the fins 224. I also may provide in this instance a valve 227 in the air passage whereby the circulation of air may be controlled either manually or by a suitable thermostat, thereby affording a further control of the interior temperature of the truck. Where, as illustrated, a refrigerant such as solid carbon dioxide is employed, this refrigerant will be surrounded by an insulating sleeve 228 and separated from the bottom of the conductor member by a suitable conductor resistance element 229. The temperatures may be controlled by regulating the thickness and character of the conductor resistance and of the insulating sleeve 228. Where water ice is employed, the sleeve 228 and conductor resistance 229 may be eliminated. It will be noted that in this case also I employ on the top of the truck body a suitable radiation shield 231.

Figure 47:
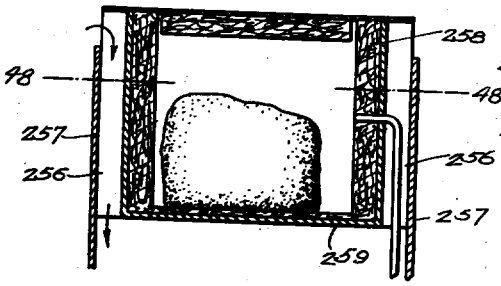
Fig. 47 is a vertical sectional view of a refrigerating unit made in accordance with my invention and of a type applicable to the refrigeration of any enclosed space.
Figure 48:
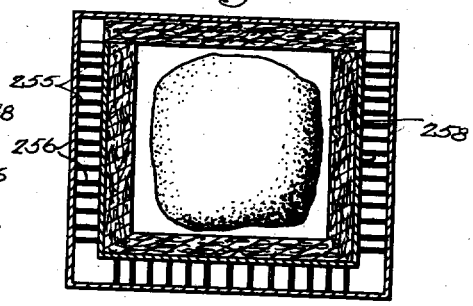
Fig. 48 is a section on the line 48—48, Fig. 47.
Figure 49:
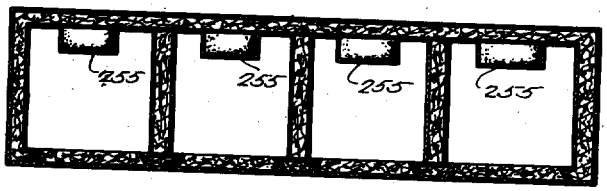
Fig. 49 is a diagrammatic horizontal sectional view illustrating the use of a unit of the type shown in the immediately preceding figures in refrigerating the various compartments of a truck or car.

Figs. 47 and 48 illustrate a unit of portable character which may be applied successfully to the refrigeration of any desired enclosed space. The unit consists of the usual thermal conductor 255 in the form of a container, three side walls of which are provided with outwardly projecting fins 256 and being provided also with baffles 257 secured to the outer edges of the fins and extending to a point short of the tops of the latter. The refrigerant may be introduced through the side or top of the conductor, and is maintained by gravity in conductive relation to the bottom wall of the latter. Where solid carbon dioxide is used, an insulating sleeve 258 is provided and also a suitable conductor resistance 259 separating the refrigerant from the conductor upon which it rests. Means is provided in the form of a duct 260 for permitting escape of the sublimed gases. An application of this unit is illustrated in Fig. 49, which shows in horizontal section a four-compartment car or truck, each compartment being provided with one of the aforedescribed units preferably suspended adjacent the top and at one side of the compartment.

I claim:

1. The method of refrigerating by means of a solid refrigerant, which consists in providing between the refrigerant and the region to be refrigerated a principal path of heat transfer in the form of a thermal conductor capable of effecting a transfer of heat from said region to the refrigerant at a rate higher than that required for a given effective refrigerating temperature, and interposing between said conductor and the refrigerant a medium of thermal-transfer resistance to thereby control and regulate the rate of heat exchange between the refrigerant and the conductor.

2. The method of refrigerating by means of a solid refrigerant, which consists in providing between the refrigerant and the region to be refrigerated a principal path of heat transfer in the form of a thermal conductor capable of effecting a transfer of heat from said region to the refrigerant at a rate higher than that required for a given effective refrigerating temperature, and interposing between said conductor and the refrigerant a medium of thermal-transfer resistance whereby the rate of heat exchange between the conductor and the refrigerant is restricted.

3. The method of refrigerating by means of a solid refrigerant, which consists in providing between the refrigerant and the region to be refrigerated a principal path of heat transfer in the form of a thermal conductor capable of effecting a transfer of heat from said region to the refrigerant at a rate higher than that required for a given effective refrigerating temperature, and interposing in said path a medium of thermal-transfer resistance to thereby control and regulate the rate of heat exchange between the refrigerant and the region to be refrigerated.

4. In a refrigerating process, the method which consists in taking up heat from the refrigerated area or mass by relatively extended surfaces of a highly conductive metal, conducting this heat by means of the conductor to a relatively small surface of a solid refrigerant, and restricting the exchange of heat between the conductor and the refrigerant by means of a medium of thermal transfer resistance located between the conductor and the refrigerant.

5. A refrigerator chamber having therein a thick-walled, gas-tight, cast-metal container substantially without exterior insulation, and having exterior metal surfaces exposed for heat absorption and moisture deposit from the atmosphere of the refrigerated space, and means for supporting solid carbon dioxide within the container in heat exchange relation but out of contact with the metal of said container.

6. Apparatus for refrigerating by the use of carbon-dioxide "ice" comprising a chamber, an insulating cabinet therein and sealed therefrom and adapted for the reception of carbon-dioxide "ice", a heat conductor having portions disposed interiorly and exteriorly of the cabinet, and vertical partitions within the cabinet subdividing the space therein into compartments, said conductor forming the bottoms of said compartments, and insulation removably superimposed upon said conductor without eliminating heat transfer between said conductor and the "ice" in said compartments.

7. Apparatus for refrigerating by the use of carbon dioxide "ice" comprising a chamber, an insulating cabinet therein and sealed therefrom and adapted for the reception of carbon dioxide "ice", a heat conductor having portions disposed interiorly and exteriorly of the cabinet, said conductor forming the bottom of the ice containing space in said cabinet, and insulation removably superimposed upon said conductor without eliminating heat transfer between said conductor and the "ice" in said cabinet.

8. Apparatus for refrigerating by the use of carbon-dioxide "ice" comprising a chamber, an insulating cabinet therein and sealed therefrom and adapted for the reception of carbon-dioxide "ice", a heat conductor plate having portions disposed interiorly and exteriorly of the cabinet, insulation removably superimposed upon said plate and reducing without eliminating heat transfer between said plate and the "ice" in said cabinet, and an insulating wall coacting with the cabinet to produce a convection channel for the chamber in which the exteriorly-disposed portions of the plate extend.

9. Apparatus for refrigerating by the use of carbon-dioxide "ice" comprising a chamber, an insulating cabinet therein and sealed therefrom and adapted for the reception of carbon-dioxide "ice", a heat conductor plate having portions disposed interiorly and exteriorly of the cabinet, said plate forming the bottom of the ice containing space in said cabinet, insulation removably superimposed upon said plate and reducing without eliminating heat transfer between said plate and the "ice" in said cabinet, said plate dividing the cabinet into two sections, and separate access doors for said sections.

10. Apparatus for refrigerating by the use of carbon-dioxide "ice" comprising a chamber, an insulating cabinet therein and sealed therefrom and adapted for the reception of carbon-dioxide "ice", a heat conductor plate having portions disposed interiorly and exteriorly of the cabinet, said plate forming the bottom of the ice containing space in said cabinet, insulation removably superimposed upon said plate and reducing without eliminating heat transfer between said plate and the "ice" in said cabinet, and thermostatically-controlled valve means regulating contact of convection currents in the chamber with the exteriorly-disposed portions of said plate.

11. Apparatus for refrigerating by the use of carbon-dioxide "ice" comprising a chamber, an insulating cabinet therein and sealed therefrom and adapted for the reception of carbon-dioxide "ice", a heat conductor plate having portions disposed interiorly and exteriorly of the cabinet, said plate forming the bottom of the ice containing space in said cabinet, insulation removably superimposed upon said plate and reducing without eliminating heat transfer between said plate and the "ice" in said cabinet, said exteriorly-disposed portions including vanes extending upwardly along the walls of the cabinet.

12. Apparatus for refrigerating by the use of carbon-dioxide "ice" comprising a chamber, an insulating cabinet therein and sealed therefrom and adapted for the reception of carbon-dioxide "ice", a heat conductor plate having portions disposed interiorly and exteriorly of the cabinet, said plate forming the bottom of the ice containing space in said cabinet, insulation removably superimposed upon said plate and reducing without eliminating heat transfer between said plate and the "ice" in said cabinet, and thermostatically-controlled valve means regulating contact of convection currents in the chamber with the exteriorly-disposed portions of said plate, said exteriorly-disposed portions including vanes extending upwardly along the walls of the cabinet.

13. Apparatus for refrigerating by the use of carbon-dioxide "ice" comprising a storage chamber, an insulated cabinet therein and sealed therefrom, a heat conductor having portions disposed interiorly and exteriorly of the cabinet, said cabinet adapted to simultaneously receive a plurality of bodies of ice, and means partially insulating certain of the bodies from the conductor.

14. Apparatus for refrigerating by the use of carbon-dioxide "ice" comprising a storage chamber, an insulated cabinet therein and sealed therefrom, a heat conductor having portions disposed interiorly and exteriorly of the cabinet, said cabinet adapted to simultaneously receive a plurality of bodies of ice, means partially insulating certain of the bodies from the conductor, said conductor subdividing the interior of the cabinet into two compartments, and separate access doors for said compartments.

15. Apparatus for refrigerating by the use of carbon-dioxide "ice" comprising a storage chamber, an insulated cabinet therein and sealed therefrom and adapted for the reception of carbon-dioxide "ice", a heat conductor having portions disposed interiorly and exteriorly of the cabinet, and means partially insulating the ice from the conductor.

16. Apparatus for refrigerating by the use of carbon-dioxide "ice" comprising a storage chamber, an insulated cabinet therein and sealed therefrom and adapted for the reception of carbon-dioxide "ice", a heat conductor having portions disposed interiorly and exteriorly of the cabinet, means partially insulating the ice from the conductor, said conductor subdividing the interior of the cabinet into two compartments, and separate access doors for said compartments.

17. Refrigerating apparatus comprising a thermal conductor in the form of a container, an insulating casing for said container, said conductor having throughout a conductive capacity capable of maintaining in all parts of the contained space a substantially uniform refrigerating temperature by means of a solid refrigerant in conductive association with that portion of the conductor forming the bottom of the container, means in said container for supporting a product above said refrigerant, and means located between the refrigerant and the conductor for regulating and controlling said conductive association.

18. Apparatus for refrigerating by means of solid carbon dioxide ice, which comprises a thermal conductor in the form of a container, an insulating casing surrounding said container, an insulating jacket in the bottom of said container enclosing the said refrigerant and extending between the refrigerant and the said conductor, said conductor having throughout a conductive capacity capable of maintaining through conductive association with the refrigerant through the said jacket all parts of the interior space of said container at a substantially uniform temperature.

19. Apparatus for refrigeration by means of solid carbon dioxide consisting of a thermal conductor in the form of a container, an insulating casing surrounding said conductor, and a refrigerant-receiving jacket in the bottom of said container extending between the refrigerant and the said conductor whereby the conductive relation between the refrigerant and the said conductor is regulated, and said conductor having a conductive capacity throughout insuring maintenance of all parts of the interior space of said container at a substantially uniform predetermined refrigerated temperature.

20. In a refrigerator for use with solid carbon dioxide, a receptacle for said refrigerant in the form of a thermal conductor having a plurality of walls, each of said walls being associated with a segregated portion of the interior of said refrigerator, and means for conductively associating the said refrigerant with at least one of said walls through a predetermined conductor resistance whereby predetermined differing refrigerated temperatures are obtained in the respective compartments.

21. In a refrigerator for use with solid carbon dioxide, a plurality of compartments, a thermal conductor constituting a means for conductively associating said compartments with the said refrigerant, the said conductor presenting to the said compartments a surface area materially greater than the surface area presented to the said refrigerant, and variable insulation mean for regulating the conductive relation between the said refrigerant and those portions of the conductor directly associated with the different compartments.

22. In a refrigerator for use with solid carbon dioxide, a plurality of compartments, a thermal conductor constituting a means for conductively associating said compartments with the said refrigerant, the said conductor presenting to the said compartments a surface area materially greater than the surface area presented to the said refrigerant, and variable insulation means for regulating the conductive relation between the said refrigerant and that portion of the conductor directly associated with the refrigerant.

23. In a refrigerator for use with solid carbon dioxide, a refrigerating compartment, a thermal conductor constituting a means for conductively associating said compartment with the said refrigerant, the said conductor presenting to the said compartment a surface area materially greater than the surface area presented to the said refrigerant, and variable insulation means for regulating the conductive relation between the said refrigerant and that portion of the conductor directly associated with the refrigerant.

24. In apparatus for refrigerating with solid refrigerants, the combination with a refrigerant-containing chamber, of a solid thermal conductor of a highly conductive metal extending from said chamber to the space to be refrigerated and presenting to the latter a surface area materially greater than the surface area presented in said chamber, and means for controlling and regulating heat transfer between said latter area and the refrigerant.

25. In apparatus for refrigerating with solid refrigerants, the combination with a refrigerant-containing chamber, of a solid thermal conductor of a highly conductive metal extending from said chamber to the space to be refrigerated and presenting to the latter a surface area materially greater than the surface area presented in said chamber, and a medium of thermal transfer resistance located between said latter area and the refrigerant whereby heat transfer between the conductor and the refrigerant is restricted.

26. A refrigerating process for transferring heat from a refrigerated space or material to a solid refrigerant, which consists in absorbing heat from the refrigerated space or material throughout the refrigerating process on a portion of a metallic heat conductor, which portion extends exteriorly of the refrigerant-containing space, conducting substantially all of said heat by an all-metallic path of heat travel formed by said conductor to the solid refrigerant, absorbing said heat from said conductor by the solid refrigerant, and controlling and regulating the rate of heat exchange between the refrigerant and the conductor by means of an interposed medium of thermal-transfer resistance, said all-metallic conductive path between the said extended heat absorbing portion of the conductor and the solid refrigerant forming the principal path of heat travel between the refrigerated space or material and the solid refrigerant.

27. A refrigerating apparatus using a solid refrigerant as the refrigerating medium, comprising an enclosed refrigerant-containing space or bunker having an access opening for charging with solid refrigerant, and a solid metallic heat conductor of a highly conductive metal which forms a direct, all-metallic, principal path of heat transfer between the space or material to be refrigerated and the solid refrigerant, said metallic conductor forming one or more of the walls of the refrigerant-containing space against which the solid refrigerant is held in heat conductive relation by gravity, said conductor having portions extended exteriorly of the refrigerant-containing space or bunker for heat absorption from the refrigerated space or material, said extended portions being adapted to absorb a major amount of the heat transmitted by said all-metallic, principal path of heat transfer directly to the solid refrigerant, and a medium of thermal transfer resistance interposed between the said conductor and the refrigerant to thereby control and regulate the rate of heat exchange between the refrigerant and conductor.

28. A refrigerating apparatus using solid carbon dioxide as the refrigerating medium, comprising an enclosed refrigerant-containing space or bunker; a solid metallic heat conductor of a highly conductive metal, a portion of which forms a wall of the refrigerant-containing space, with which portion the solid carbon dioxide is maintained in heat exchange relation by gravity, and other portions of which are extended exteriorly of the refrigerant-containing space for heat absorption from the refrigerated space or material; and a medium of thermal transfer resistance interposed between said conductor wall and the refrigerant to control the rate of heat exchange between the refrigerant and the conductor for regulating the temperature of the refrigerated space, said conductor forming a direct, all-metallic, principal path of heat transfer between the refrigerated space and the refrigerant, and said extended portions being adapted to absorb a major amount of the heat transmitted by said conductor.

EDWARD RICE, Jr.